(12) United States Patent
Janiszewski et al.

(10) Patent No.: US 10,795,041 B2
(45) Date of Patent: Oct. 6, 2020

(54) FLARED PSEUDO-RANDOM SPIRAL MARINE ACQUISITION

(71) Applicant: CONOCOPHILLIPS COMPANY, Houston, TX (US)

(72) Inventors: Frank D. Janiszewski, Richmond, TX (US); Joel D. Brewer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 172 days.

(21) Appl. No.: 14/055,507

(22) Filed: Oct. 16, 2013

(65) Prior Publication Data

US 2014/0104984 A1 Apr. 17, 2014

Related U.S. Application Data

(60) Provisional application No. 61/714,308, filed on Oct. 16, 2012.

(51) Int. Cl.
*G01V 1/38* (2006.01)

(52) U.S. Cl.
CPC .......... *G01V 1/3817* (2013.01); *G01V 1/3808* (2013.01)

(58) Field of Classification Search
None
See application file for complete search history.

(56) References Cited

U.S. PATENT DOCUMENTS

| | | | |
|---|---|---|---|
| 4,567,582 A | 1/1986 | Kuhn | |
| 4,912,682 A * | 3/1990 | Norton, Jr. | G01S 5/30 367/19 |
| 4,965,773 A * | 10/1990 | Marschall | G01V 1/003 181/110 |
| 4,970,696 A | 11/1990 | Crews et al. | |
| 5,402,745 A | 4/1995 | Wood | |
| 5,430,689 A | 7/1995 | Rigsby et al. | |
| 7,190,634 B2 | 3/2007 | Lambert et al. | |
| 7,286,442 B2 | 10/2007 | Ray et al. | |
| 7,400,552 B2 | 7/2008 | Moldoveanu et al. | |
| 7,450,467 B2 | 11/2008 | Tveide et al. | |
| 7,616,522 B2 | 11/2009 | Rouquette | |
| 8,120,991 B2 * | 2/2012 | Koren | G01V 1/32 367/72 |
| 8,780,669 B2 * | 7/2014 | Janiszewski | G01V 1/3808 367/15 |
| 2003/0067842 A1 | 4/2003 | Sukup et al. | |
| 2008/0109168 A1 * | 5/2008 | Koren | G01V 1/32 702/16 |
| 2008/0285381 A1 * | 11/2008 | Moldoveanu | G01V 1/3808 367/20 |

(Continued)

FOREIGN PATENT DOCUMENTS

| | | | | |
|---|---|---|---|---|
| WO | 20110059896 A1 | 5/2011 | | |
| WO | WO2011057324 A1 | 5/2011 | | |
| WO | WO 2014062826 A1 * | 4/2014 | ......... | G01V 1/3817 |

OTHER PUBLICATIONS

PCT International Preliminary Report of Patentability (dated Jan. 31, 2014).

(Continued)

*Primary Examiner* — Hovhannes Baghdasaryan
*Assistant Examiner* — Jonathan D Armstrong

(57) ABSTRACT

A method for acquisition of seismic data in a marine environment.

20 Claims, 3 Drawing Sheets

(56) References Cited

U.S. PATENT DOCUMENTS

| | | | | |
|---|---|---|---|---|
| 2009/0122640 A1* | 5/2009 | Hill | G01V 1/3808 | 367/16 |
| 2009/0147621 A1 | 6/2009 | Hegna | | |
| 2009/0296518 A1* | 12/2009 | MacNeill | G01V 1/3808 | 367/15 |
| 2009/0296520 A1* | 12/2009 | Keers | G01V 1/364 | 367/20 |
| 2010/0002536 A1* | 1/2010 | Brewer | G01V 1/38 | 367/16 |
| 2011/0158041 A1* | 6/2011 | Moldoveanu | G01V 1/003 | 367/14 |
| 2011/0158042 A1* | 6/2011 | Moldoveanu | G01V 1/3808 | 367/15 |
| 2011/0261646 A1* | 10/2011 | MacNeill | G01V 1/3808 | 367/20 |
| 2011/0305107 A1* | 12/2011 | Eick | G01V 1/3826 | 367/20 |
| 2012/0002503 A1* | 1/2012 | Janiszewski | G01V 1/3826 | 367/20 |
| 2014/0200812 A1* | 7/2014 | Kitchenside | G01V 1/364 | 702/14 |
| 2014/0365131 A1* | 12/2014 | Elboth | G01V 1/28 | 702/14 |
| 2014/0369162 A1* | 12/2014 | Teyssandier | G01V 1/3808 | 367/15 |
| 2015/0063064 A1* | 3/2015 | van Groenestjin | G01V 1/362 | 367/21 |
| 2015/0109882 A1* | 4/2015 | Rentsch-Smith | G01V 1/364 | 367/14 |
| 2015/0293241 A1* | 10/2015 | Hegna | G01V 1/003 | 367/15 |
| 2017/0075015 A1* | 3/2017 | Halliday | G01V 1/3861 | |
| 2018/0259666 A1* | 9/2018 | Siliqi | G01V 1/3808 | |

OTHER PUBLICATIONS

PCT International Search Report and Written Opinion of International Searching Authority (dated Jan. 31, 2014).

* cited by examiner

FLARED PSEUDO-RANDOM SPIRAL MARINE ACQUISITION

CROSS-REFERENCE TO RELATED APPLICATIONS

This application is a non-provisional application which claims benefit under 35 USC § 119(e) to U.S. Provisional Application Ser. No. 61/714,308 filed Oct. 16, 2012, entitled "FLARED PSEUDO-RANDOM SPIRAL MARINE ACQUISITION," which is incorporated herein in its entirety.

FIELD OF THE INVENTION

The present invention relates generally to a method for acquisition of seismic data in a marine environment. More particularly, but not by way of limitation, embodiments of the present invention include a method for acquiring seismic data in a marine environment using survey paths following spiral shooting paths.

BACKGROUND OF THE INVENTION

Marine seismic exploration investigates and maps the structure and character of subsurface geological formations underlying a body of water. Marine seismic data is typically gathered by towing seismic sources (e.g., air guns) and seismic receivers (e.g., hydrophones) through a body of water behind one or more marine vessels. As the seismic sources and receivers are towed through the water, the seismic sources generate acoustic energy that travel through the water and into the earth, where they are reflected and refracted by interfaces between subsurface geological formations. The seismic receivers detect the resulting reflected and refracted energy, thus acquiring seismic data that provides seismic information about the geological foundations underlying the body of water.

Typically, large arrays of seismic receivers, often numbering in the thousands, are used to gather marine seismic data. The seismic receivers are generally attached to and spaced apart along streamer cables that are towed behind a marine vessel.

By way of illustration of such a system, FIG. 1 shows a simplified depiction of a conventional marine seismic data acquisition system employing a marine vessel 10 to tow seismic sources 12 and a system 14 of steerable seismic streamers 16 through a body of water 18.

Each of seismic streamers 16 includes a streamer cable 20, a series of seismic receivers 22 and a series of steering devices 24 coupled to cable 20. Relative positions of the marine seismic receivers during seismic data acquisition can affect the quality and utility of the resulting seismic data. However, unpredictable environmental forces such as currents, winds, and sea states present in many marine environments can cause the relative positions of marine seismic receivers to vary greatly as they are towed through the water. Therefore, it is common for steering devices (commonly know as "birds") to be attached to the streamer cables so that the relative positions (both lateral and vertical) of the seismic receivers can be controlled as they are towed through the water. As depicted in FIG. 1, during conventional marine seismic acquisition, steering devices 24 are used to maintain substantially constant lateral spacing between seismic streamers 16.

As a further illustration of typical marine seismic systems, FIG. 2 illustrates a side view of marine vessel 10 towing one or more streamers 12 having seismic sources 12 ( ) and/or seismic receivers 22 (O) through body of water 18 to acquire seismic data for a subterranean geological formation region of interest 26 of geological formation 25.

As marine vessel 10 tows seismic sources 12 and receivers 22 through body of water 18, seismic sources 12 are simultaneously excited, which generate acoustic wave energy that propagates down through water 18 and into geological formation 25. The acoustic wave energy is then reflected and refracted by interfaces between strata of geological formation 25. The resulting reflected/refracted seismic energy then passes upwardly through water 18 and is detected by seismic receivers 22. Additional passes are then conducted to survey additional points of interest. The seismic data detected by seismic receivers 22 then provides seismic information representative of subterranean geological formation of interest 26.

A common problem encountered with conventional marine seismic surveys is "gaps" in the acquired seismic data. These data gaps can occur when the spacing between adjacent acquisition passes is too large to provide sufficient resolution for proper data processing. Gaps in seismic data can be caused by a number of factors including, for example, skewing of the seismic streamers relative to the direction of travel of the towing vessel during data acquisition. Even when steerable streamers are employed, gaps in seismic data are common, particularly when strong crosscurrents are present. When strong crosscurrents are present during seismic data acquisition, it is not practical to maintain all the streamers in desired orientation, because fighting strong crosscurrents with steering devices may produce noise that dramatically reduces the quality of the gathered seismic data.

When gaps in marine seismic data are discovered, if the data gaps cannot be filled by post-acquisition interpolation methods, the areas corresponding to the data gaps must be resurveyed, a process commonly known as "shooting in-fill" or "in-filling." Unfortunately, the existence of gaps in marine seismic data may not be discovered until the initial marine seismic survey has been completed and the resulting seismic data is being processed. Obviously, in-filling is highly undesirable because of the significant expense and time involved in resurveying in-fill areas that may be located hundreds of kilometers from one another or even retransiting the same vessel pass again to make up coverage.

Traditionally, marine seismic surveys using the systems depicted in FIGS. 1 and 2 above are conducted using a series of straight line sail paths across a region on interest. That is, under conventional methods, a marine vessel and its corresponding streamers sail back and forth across a geological region of interest, incrementally moving each subsequent pass or sweep over slightly until all of the combined paths have covered the survey region of interest. In this way, traditional seismic surveys follow a survey path similar to the path followed by one mowing a rectangular section of lawn with a lawn mower, namely, a back and forth straight line path that is moved over incrementally each pass until the entire section of lawn is covered.

Referring again to FIG. 1, traditional marine seismic survey systems employ a set of streamers where the lateral distance ($d_f$) of the forward-most seismic receivers is equivalent to the lateral distance ($d_r$) of the rearwardly-most seismic receivers. Thus, in surveying a region of interest, a marine vessel 10 will typically employ a back and forth path across a geological region of interest, moving each pass or sweep over by roughly a distance of $\frac{1}{2}d_f$ to a distance of about 1 $d_f$ until the entire region of interest is surveyed. As will be seen below, this method of surveying suffers from a poor randomization and distribution of source point locations and receivers throughout the survey area. For example, for a ten streamer setup with dual sources towed by the streamer vessel, $d_f$ might be about 900 m but each sail line would move over about 500 m. Accordingly, this poor randomization and distribution results in a decreased effectiveness of post-acquisition interpolation methods for filling in seismic data gaps in the acquired data.

Consequently, this method of surveying with a series of straight paths across a region is a highly inefficient way of gathering off-set and azimuth distributions. Using conventional methods to acquire wide azimuth distributions requires multiple passes down the same line with multiple boats, usually a single streamer vessel and multiple source vessels or two streamer vessels and multiple source vessels. Even using multiple passes and multiple vessels, the azimuth distribution acquired is still limited in certain directions. In this way, conventional methods of seismic surveys fail to provide full offset and azimuth data and further fail to optimize the randomization of the offset and azimuth data available. Accordingly, conventional methods of surveying a region are unnecessarily more costly in terms of both time and direct survey costs. Indeed, the cost of acquiring wide-azimuth data essentially increases by the cost of the number of passes required down each sail line to obtain the azimuth range required. For conventional marine surveys that are not wide azimuth, costs can be increased by as much as 50% by infill needs.

Accordingly, there is a need in the art for improved seismic survey method that address one or more disadvantages of the prior art.

SUMMARY OF THE INVENTION

In an embodiment, a method for acquiring seismic data for a subsea region of the earth includes: providing a marine seismic vessel and a plurality of steerable seismic streamers, wherein the plurality of steerable seismic streamers are coupled to the marine seismic vessel for towing, wherein each steerable seismic streamer comprises a plurality of marine seismic receivers spaced apart along the length of each steerable seismic streamer; providing a plurality of marine seismic sources; towing the steerable seismic streamers through the marine environment such that the marine seismic vessel and the steerable seismic streamers travel substantially along a continuous spiral paths; exciting at least one of the marine seismic sources simultaneously with the step of towing the steerable seismic streamers so as to cause acoustic wave energy to travel through the marine environment into the subsea region of the earth; allowing the acoustic wave energy to reflect and refract from the subsea region so as to form reflected and refracted wave energy; and detecting the reflected and refracted wave energy with the marine seismic receivers as to form detected seismic data.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
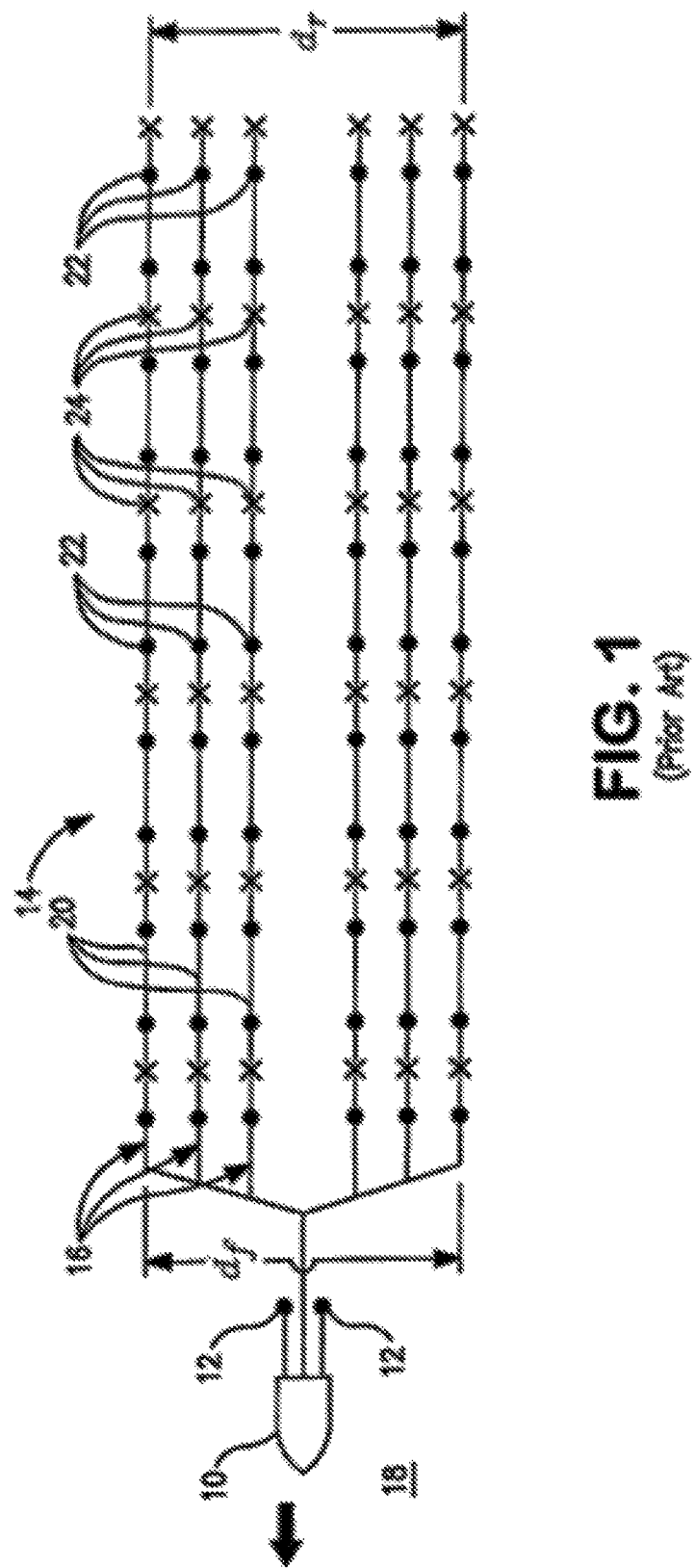
FIG. 1 illustrates a simplified overhead depiction of a conventional marine seismic acquisition system where the lateral spacing between the streamers is substantially constant over the entire length of streamers.
Figure 2:
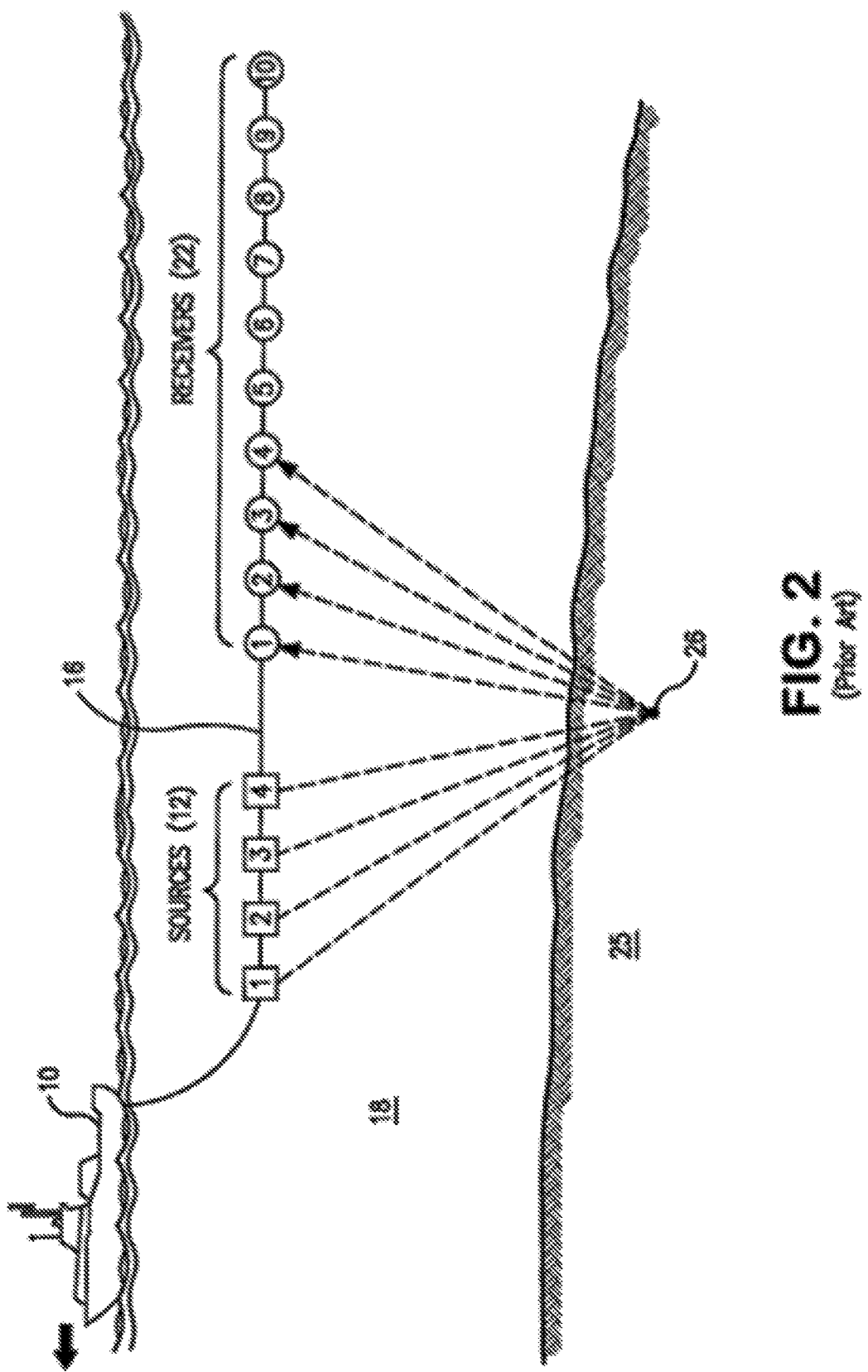
FIG. 2 illustrates a side view of a marine vessel towing a plurality of marine seismic sources and a plurality of marine seismic receivers for conducting seismic surveys of a subsea region of the earth.

Reference will now be made in detail to embodiments of the present invention, one or more examples of which may be illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

The present invention relates generally to a method for acquisition of seismic data in a marine environment. More particularly, but not by way of limitation, embodiments of the present invention include methods for acquiring seismic data in a marine environment using survey paths following a continuous spiral path.

A method is provided for acquiring wide azimuth seismic data over a subsurface target. In certain embodiments, at least one marine streamer vessel towing multiple seismic streamers may be equipped with a marine seismic source in either a single or a dual source configuration. The marine streamer vessel may be equipped to outfit the deployed seismic streamer with a full complement of steering, depth and lateral devices for each seismic streamer, i.e., steerable seismic streamers. In certain embodiments, a source vessel may be utilized containing one or more sources. The source vessel may have a marine seismic source in either a single or dual source configuration. The method may include a single streamer vessel or may include multiple streamer vessels and multiple source vessels.

The marine streamer vessel sails along a continuous spiral path while acquiring seismic data. The shape of the continuous spiral path may be roughly circular and may be optimized to meet objectives required to adequately image the subsurface target. The continuous spiral path can take the form of a circular path, an elongated elliptical path, or any combination thereof. The continuous spiral paths shape and size can vary within the survey. Since the continuous spiral paths will be continuous there will be no line change time from one to another. The seismic acquisition will occur continuously across the survey. Breaks in the acquisition will be based on time instead of sail line length and location.

As the marine streamer vessel travels along the continuous spiral path, one or more sources may be excited so as to introduce acoustic wave energy in the marine environment and subsequently into the subsea region of the earth. The acoustic wave energy then reflects and refracts from the subsea region so as to form reflected and refracted wave energy, which is detected by marine seismic receivers that are spaced along the length of the seismic streamers. The detected seismic data is then interpreted to reveal seismic information representative of the surveyed subsea region of the earth.

Figure 3:
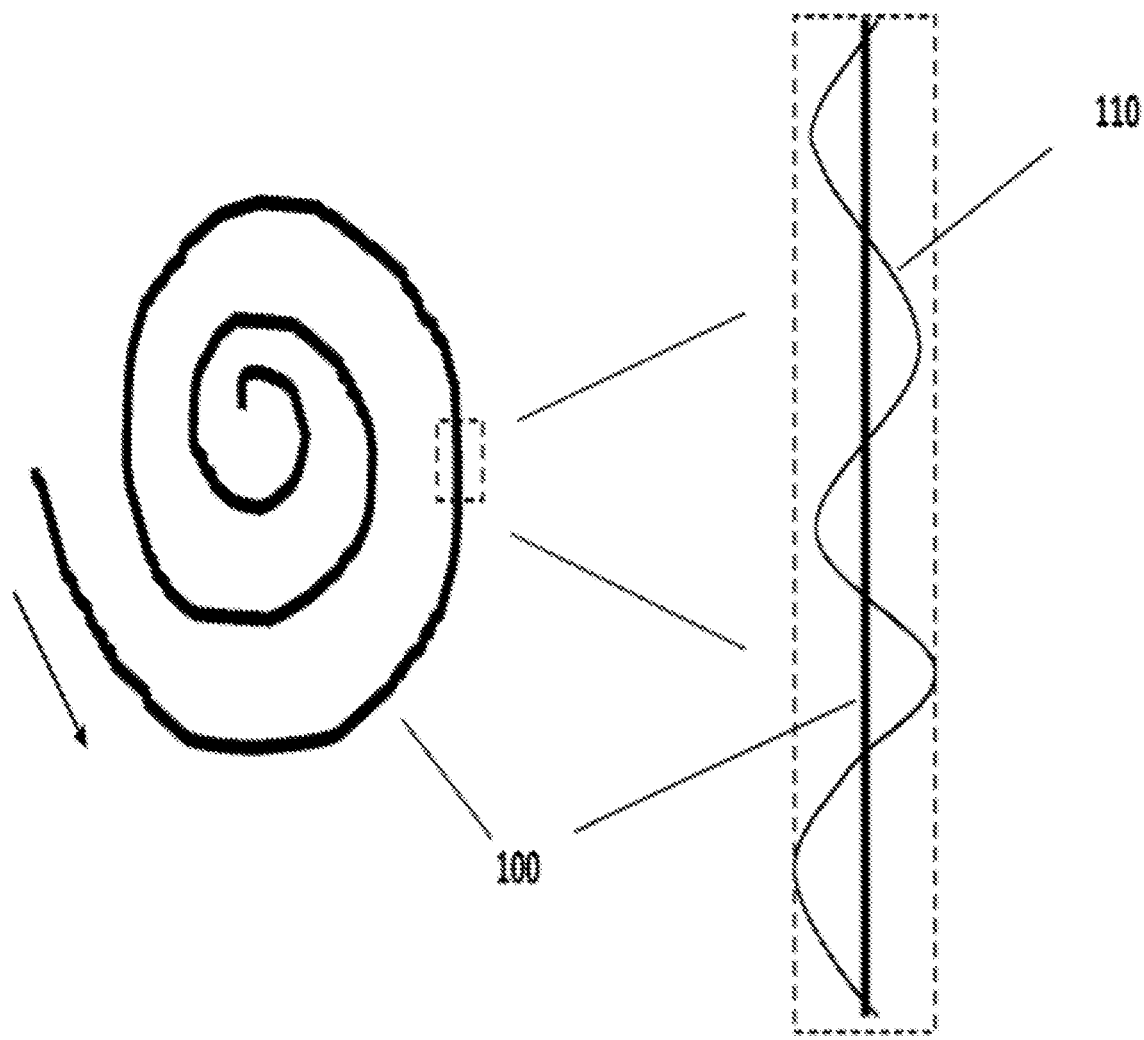
FIG. 3 illustrates an example continuous spiral path along which a marine streamer vessel sails while acquiring seismic data.

Other enhancements to the methods herein include, but are not limited to, configuring the steerable streamers in a flared configuration, wherein the lateral spacing increases rearwardly over the length of the seismic steerable streamers or a trumpet-shaped system of variable length seismic streamers exhibiting lateral streamer spacing that increases rearwardly at an increasing rate over the length of the seismic streamers. U.S. patent application Ser. No. 12/167,683, filed Jul. 3, 2008, titled "Marine Seismic Acquisition with Controlled Streamer Flaring," the entire disclosure of which is incorporated by reference, describes a number of possible streamer configurations, streamer elements, and devices, all of which may be used in combination with embodiments of the present invention. For example, the separations between each streamer at the tails of the streamers can be greater than the separation 1. The steerable stream and software may be used to maintain a smooth transition from the streamer separation distance at the front to the streamer separation distance at the tail, while maintaining a spiral segment curved shape. The steerable streamers may also be used to put a sinusoidal shape into the streamers. Each streamer may have a sinusoidal shape similar to the streamer adjacent to it. Referring to FIG. 3, the streamer vessel may sail a generally sinusoidal path 110 along each spiral survey 100. The sinusoidal course 110 may be overlain on the general spiral course 100 with the center of the sinusoid shape falling along the path sail line. If additional streamers and source vessel are being utilized they may also follow a sinusoidal course in a similar fashion as the streamer vessel.

The sinusoidal paths of the streamer vessels and streamers will randomize the locations of the source point and the receivers throughout the survey. This randomization may reduce the effect of the acquisition footprint in the final processed data. It may also increase the effectiveness of the interpolation methods already in use to fill holes in the data acquired.

Advantages of certain embodiments of the present invention include, but are not limited to, a reduction of the number of marine vessel runs or paths required to complete a survey area, increased survey efficiency and coverage, a more effective randomization of the locations of source point and receivers throughout the area, a reduction of the acquisition footprint in the final processed data, an increase of the effectiveness of post-acquisition interpolation methods used to fill holes or gaps in the acquired data, lower survey costs, decreased survey times, and maximization of the available offset and wide azimuth data.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. US 2012/0002503 (Janiszewski; Brewer; Shan; Eick) "Seismic Acquisition in Marine Environments using Survey Paths following a Series of Linked Deviated Paths and Methods of Use." (2010).

The invention claimed is:

1. A method for acquiring seismic data for a subsea region of the earth, the method comprising:
   providing a marine seismic vessel and a plurality of steerable seismic streamers, wherein the plurality of steerable seismic streamers are coupled to the marine seismic vessel for towing, wherein each of the plurality of steerable seismic streamers comprises a plurality of marine seismic receivers spaced apart along a length of each of the plurality of steerable seismic streamers, wherein the plurality of steerable seismic streamers is maintained in a flared configuration;
   providing a plurality of marine seismic sources;
   sailing the marine seismic vessel in a marine environment along a continuous spiral path, the continuous spiral path following a curve winding around a central point at one of an increasing distance or a decreasing distance from the central point;
   towing the steerable seismic streamers through the marine environment such that the marine seismic vessel and each of the plurality of steerable seismic streamers travel along the continuous spiral path, wherein one or more segments of the continuous spiral path are elliptical or circular whose size or shape vary along a single survey, wherein the steerable seismic streamers move in a sinusoidal coarse overlain on the continuous spiral path with a center of the sinusoidal coarse falling along a line of the continuous spiral path, such that locations of the plurality of marine seismic sources and the plurality of marine seismic receivers are randomized;
   exciting at least one of the marine seismic sources simultaneously with the step of towing the steerable seismic streamers so as to cause acoustic wave energy to travel through the marine environment into the subsea region of the earth;
   allowing the acoustic wave energy to reflect and refract from the subsea region so as to form reflected and refracted wave energy; and
   detecting reflected and refracted wave energy with the marine seismic receivers as to form detected seismic data wherein the continuous spiral path increases an effectiveness of interpolation for the detected seismic data.

2. The method according to claim 1, wherein one or more of the plurality of marines seismic sources are coupled to the marine seismic vessel.

3. The method according to claim 1, further comprising:
   providing a second marine vessel wherein one or more of the plurality of marine seismic sources are coupled to the second marine vessel.

4. A system for acquiring seismic data for a subsea region of the earth, the system comprising:

a marine seismic vessel sailing in a marine environment along a continuous spiral path, the continuous spiral path following a curve winding around a central point at one of an increasing distance or a decreasing distance from the central point, one or more segments of the continuous spiral path having at least one of a size or a shape varying along a single survey;

one or more marine seismic sources delivering acoustic wave energy through the marine environment into the subsea region of the earth as the marine seismic vessel sails along the continuous spiral path;

a plurality of seismic streamers coupled to the marine seismic vessel, the marine seismic vessel towing the plurality of seismic streamers along the continuous spiral path, the plurality of seismic streamers following a sinusoidal coarse along each spiral survey, the sinusoidal coarse overlain on the continuous spiral path;

a plurality of receivers spaced apart along a length of each of the plurality of seismic streamers, the plurality of receivers capturing seismic data at a plurality of randomized locations in the marine environment, the plurality of randomized locations created by a combination of the sinusoidal coarse along each spiral survey and the continuous spiral path, the seismic data generated from the acoustic wave energy being reflected and refracted from the subsea region.

5. The system of claim 4, wherein the one or more marine seismic sources follow the sinusoidal coarse.

6. The system of claim 4, wherein the one or more marine seismic sources are positioned at a second plurality of randomized locations created by the combination of the sinusoidal coarse along each spiral survey and the continuous spiral survey.

7. The system of claim 4, wherein the one or more marine seismic sources are coupled to the marine seismic vessel.

8. The system of claim 4, wherein the one or more marine seismic sources are coupled to a second marine seismic vessel.

9. The system of claim 4, wherein a center of the sinusoidal coarse is positioned along a line of the continuous spiral path.

10. The system of claim 4, wherein the plurality of seismic streamers are steerable.

11. The system of claim 4, wherein the plurality of seismic streamers are maintained in a flare configuration.

12. The system of claim 4, wherein the continuous spiral path includes at least one of one or more circular segments or one or more elliptical segments.

13. The system of claim 4, wherein seismic acquisition occurs continuously as the marine vessel sails along the continuous spiral path.

14. A method for acquiring seismic data for a subsea region of the earth, the method comprising:

sailing a marine seismic vessel in a marine environment along a continuous spiral path, the continuous spiral path following a curve winding around a central point at one of an increasing distance or a decreasing distance from the central point, one or more segments of the continuous spiral path having at least one of a size or a shape varying along a single survey;

delivering acoustic wave energy through the marine environment into the subsea region of the earth using one or more marine seismic sources as the marine seismic vessel sails along the continuous spiral path;

towing a plurality of seismic streamers along the continuous spiral path using the marine seismic vessel; and capturing seismic data at a plurality of randomized locations in the marine environment using a plurality of seismic receivers spaced apart along a length of each of the plurality of seismic streamers, the plurality of randomized locations created by the continuous spiral path, the seismic data generated from the acoustic wave energy being reflected and refracted from the subsea region.

15. The method of claim 14, wherein the plurality of seismic streamers follow a sinusoidal coarse along each spiral survey, the sinusoidal coarse overlain on the continuous spiral path.

16. The method of claim 15, wherein a center of the sinusoidal coarse is positioned along a line of the continuous spiral path.

17. The method of claim 15, wherein the one or more marine seismic sources are positioned at a second plurality of randomized locations created by a combination of the sinusoidal coarse along each spiral survey and the continuous spiral survey.

18. The method of claim 14, wherein the plurality of seismic streamers are maintained in a flare configuration.

19. The method of claim 14, wherein the plurality of seismic streamers are steerable.

20. The method of claim 14, wherein the one or more marine seismic sources are coupled to the marine seismic vessel.

* * * * *